No. 819,683. PATENTED MAY 1, 1906.
H. D. WILLIAMS.
MECHANICAL MOVEMENT.
APPLICATION FILED MAR. 14, 1904. RENEWED OCT. 7, 1905.

2 SHEETS—SHEET 1.

WITNESSES
May E. Kott.
J. G. Massey

INVENTOR
Harvey D. Williams
By Parker & Burton
Attorneys.

No. 819,683. PATENTED MAY 1, 1906.
H. D. WILLIAMS.
MECHANICAL MOVEMENT.
APPLICATION FILED MAR. 14, 1904. RENEWED OCT. 7, 1905.

2 SHEETS—SHEET 2.

WITNESSES
May E. Kott.
J. F. Massey

INVENTOR
Harvey D. Williams
By Parker & Burton
Attorneys.

UNITED STATES PATENT OFFICE.

HARVEY D. WILLIAMS, OF WASHINGTON, DISTRICT OF COLUMBIA, ASSIGNOR OF ONE-HALF TO WATERBURY TOOL COMPANY, OF WATERBURY, CONNECTICUT, A CORPORATION OF CONNECTICUT.

MECHANICAL MOVEMENT.

No. 819,683.          Specification of Letters Patent.          Patented May 1, 1906.

Application filed March 14, 1904. Renewed October 7, 1905. Serial No. 281,753.

*To all whom it may concern:*

Be it known that I, HARVEY D. WILLIAMS, a citizen of the United States, residing at Washington, in the District of Columbia, have invented a certain new and useful Improvement in Mechanical Movements; and I declare the following to be a full, clear, and exact description of the invention, such as will enable others skilled in the art to which it pertains to make and use the same, reference being had to the accompanying drawings, which form a part of this specification.

This invention relates to mechanical movements; and the object of my improvements is to provide an improved mechanical movement by which rotary and rectilinear movements may be converted one into the other without producing an unbalanced inertia effect. I attain this object in the device illustrated in the accompanying drawings, which shows my invention embodied in a gas-engine and acting to transform the reciprocating motion of the piston into the rotary motion of the shaft.

Figure 1:
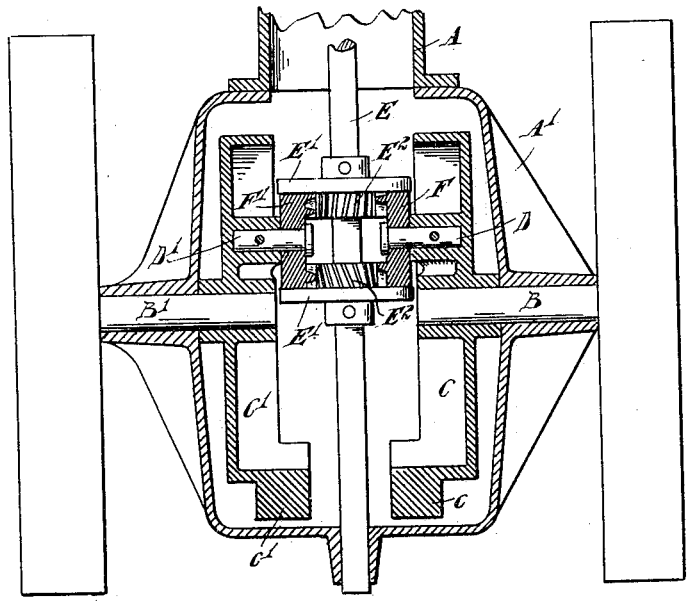
Figure 3:
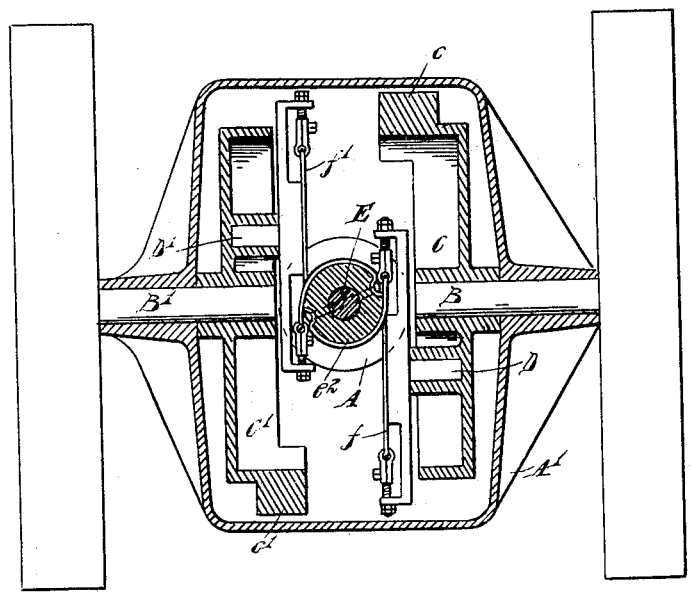
Figure 2:
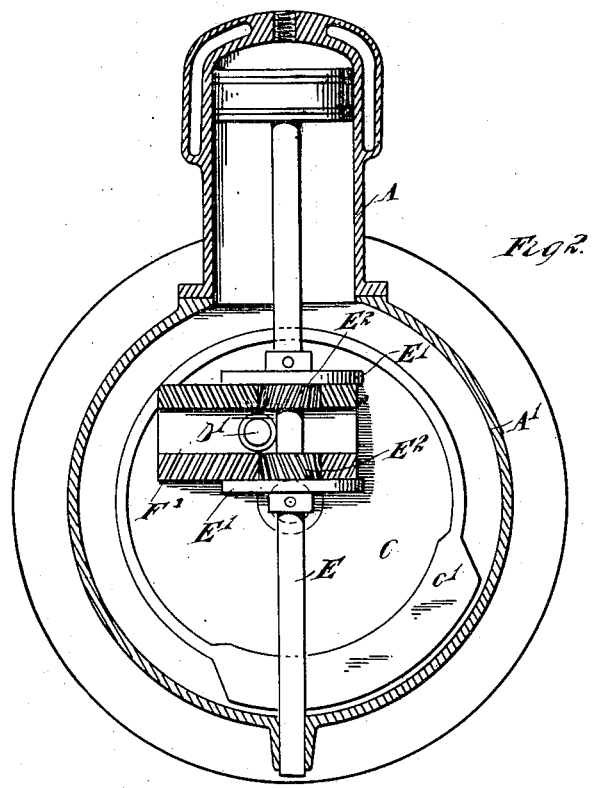
Figure 4:
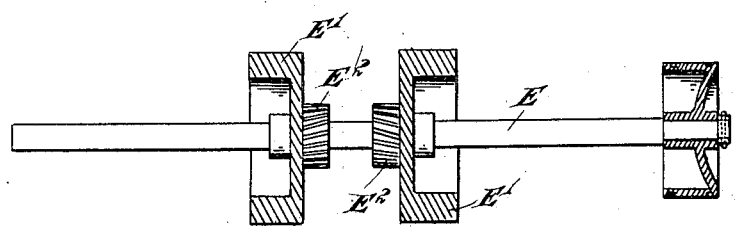

Figure 1 is a plan view in section of the crank-case of an engine and a portion of the cylinder. Fig. 2 is an elevation, partly in section, the right-hand portion, as shown in Fig. 1, being removed. Fig. 3 is a section similar to Fig. 2, showing a modification of a portion of the mechanism. Fig. 4 is a detail view of the reciprocating parts, showing the piston-rod pivoted in the piston.

A is the cylinder, and A' the crank-case, of a gas-engine.

B and B' are shafts journaled axially in line with each other and adapted to rotate in bearings in the crank-case A'.

C is a disk upon the inner end of the shaft B, and C' is a similar disk upon the inner end of the shaft B'.

D is a wrist-pin upon the disk C, and D' is a wrist-pin upon the disk C'

F is a double rack pivoted at its center upon the wrist-pin D, and F' is a similar rack centrally pivoted upon the wrist-pin D'

E is the piston-rod.

E' E' are disks secured upon the piston-rod E and inclosing between them the racks F F'.

$E^2 E^2$ are spur-gears keyed upon the piston-rod E, the teeth of which mesh with the teeth of the racks F F'. To diminish lost motion, twisted gearing is used.

$c$ is a counterweight on the disk C, and $c'$ is a counterweight upon the disk C'. The disks C C' are arranged to rotate at an equal angular velocity in opposite directions, and the counterweights $c$ $c'$ are so placed that they shall be simultaneous directly opposite the wrist-pins D D' at the dead-centers. The counterweights $c$ $c'$ are placed at equal distances from the center and are of equal weight and are together of such a weight and so placed that their centrifugal force shall balance the force due to the acceleration of the reciprocating parts at the dead-centers and also the centrifugal force of the wrist-pins D D' and racks F F'. The pitch-lines of the gear-wheels $E^2 E^2$ are preferably of a radius equal to the radius of gyration of the reciprocating parts about the axis of the piston-rod E.

The operation of the above-described device is as follows: The impulse is given in the ordinary way to the piston and is conveyed to the wrist-pins D D' through the disks E' E' acting upon the sides of the racks F F' as a Scotch yoke acts through the block upon the wrist-pin in the ordinary well-understood construction. It will be understood that the force due to the inertia of the reciprocating parts in their direction of motion is completely balanced by the component in that direction of the centrifugal force of the counterweights $c$ $c'$. As the disks C C' turn in opposite directions the reciprocating parts are rotated by means of the racks F F' at a speed that shall give the point of contact a velocity equal, in a horizontal engine, to the vertical component of the velocity of the wrist-pins D D'. Therefore the vertical component of the centrifugal force of the counterweights $c$ $c'$ will be completely balanced by the rotational inertia of the reciprocating parts.

The modification shown in Fig. 3 consists in substituting belts $f$ $f'$, acting upon the drum $e^2$, secured to the piston-rod E, in place of the racks F F' and gears $E^2 E^2$.

The modification shown in Fig. 4 consists in pivoting the piston-rod in the piston or elsewhere. In this case it will be necessary to increase the effective rotational inertia of the reciprocating parts, which rotate by adding weight at a point having a greater radius than the radius of gyration of such parts.

It will be observed in the above-described device that not only is the inertia of the reciprocating parts completely balanced without introducing an unbalanced inertia effect, but that the reverse torques balance each other. If there be only one shaft and disk, the counterweight of said disk must be sufficient in itself to balance the inertia of the reciprocating parts at their dead-centers. It is evident that cranks could be substituted for the disks F F', if desired, without departing from my invention. It will also be noticed that the forces upon the disks E' are always equal and at equal distances upon opposite sides of the axis of the piston-rod, so that there is no tendency to bend said rod.

What I claim is—

1. The combination of a reciprocating part, a rotating part, means for connecting said parts so that the reciprocating part shall move with a velocity proportional to a component in one direction of the velocity of a point upon the rotating part and shall rotate with a velocity proportional to the component of the velocity of said point in a direction at an angle to the first-named component, and a counterweight upon said rotating part adapted to balance the inertia of the reciprocating part due to its change of lineal velocity.

2. The combination of a reciprocating part, and two rotating parts adapted to turn in opposite directions, and means for connecting said parts so that the reciprocating part shall move with a velocity proportional to a component in one direction of the velocity of a point upon each of said rotating parts, and shall rotate with a velocity proportional to the component of the velocity of said points in a direction at an angle to the first-named component.

3. The combination of a reciprocating part, and a rotating part upon each side of said reciprocating part, and means for connecting said parts so that the reciprocating part shall move with a velocity proportional to a component in one direction of the velocity of a point upon each of said rotating parts, and shall rotate with a velocity proportional to the component of the velocity of said points at an angle to the first-named component and a counterweight upon each of said rotating parts said counterweights being adapted to balance the lineal inertia of the reciprocating part.

4. The combination of a reciprocating part, a crank adapted to rotate, a crank-pin on said crank, means connecting said crank-pin with said reciprocating part so that the latter shall move with said crank-pin in one direction and rotate with a velocity proportional to the velocity of said crank-pin in another direction and a counterweight on said crank adapted to balance the lineal inertia of the reciprocating part.

5. The combination of a reciprocating part, a crank upon each side of said reciprocating part, said cranks being adapted to rotate in opposite directions, crank-pins upon said cranks, means connecting said crank-pins with said reciprocating part so that the latter shall move with said crank-pins in one direction and rotate with a velocity proportional to the velocity of said crank-pins in another direction and a counterweight on each of said cranks adapted to balance the lineal inertia of the reciprocating part.

6. The combination of a reciprocating part, a crank upon each side thereof, wrist-pins in said cranks, blocks pivoted upon said wrist-pins, and connected to said reciprocating part so as to rotate the same, said reciprocating part being adapted to contact the sides of said blocks, and counterweights upon said cranks adapted to balance the lineal inertia of the reciprocating part.

7. The combination of a reciprocating part, a crank upon each side thereof, wrist-pins in said cranks, blocks provided with racks upon said wrist-pins, a gear-wheel upon the reciprocating part engaging with said racks, said reciprocating part being adapted to contact the sides of said blocks, and counterweights upon said cranks adapted to balance the lineal inertia of the reciprocating part.

8. The combination of a reciprocating part, a revoluble crank on one side thereof, a wrist-pin in said crank, a block upon said wrist-pin, the reciprocating part being adapted to contact the sides of said block, said block being connected to the reciprocating part so as to rotate the same, and a counterweight adapted to balance the lineal inertia of the reciprocating part.

9. The combination of a reciprocating part, a revoluble crank on one side thereof, a wrist-pin in said crank, a block upon said wrist-pin provided with a rack, a gear-wheel upon said reciprocating part engaging said rack, said reciprocating part being adapted to contact the sides of said block, and a counterweight upon said crank adapted to balance the lineal inertia of said reciprocating part.

10. The combination of a reciprocating part, a yoke thereon, two cranks adapted to turn in opposite directions, wrist-pins on said cranks, said yoke engaging said wrist-pins at equal distances upon opposite sides of the axis of the reciprocating part.

11. The combination of a reciprocating part, a crank upon each side thereof, wrist-pins on said cranks, blocks pivoted upon said wrist-pins, and connected to said reciprocating part so as to cause the same to rotate, said reciprocating part being adapted to contact the sides of said blocks.

12. The combination of a reciprocating part, a crank upon each side thereof, wrist-pins on said cranks, blocks provided with racks upon said wrist-pins, a gear-wheel upon the reciprocating part engaging with said racks, the reciprocating part being adapted to contact said blocks.

In testimony whereof I sign this specification in the presence of two witnesses.

HARVEY D. WILLIAMS.

Witnesses:
 JOHN D. BIDDIS
 LEWIS J. MAURO.